United States Patent [19]

Hashimoto

[11] Patent Number: 4,829,557
[45] Date of Patent: May 9, 1989

[54] TELEPHONE ANSWERING DEVICE HAVING OUTGOING MESSAGE PAUSE TIMER FUNCTION

[75] Inventor: Kazuo Hashimoto, Tokyo, Japan

[73] Assignee: Hashimoto Corporation, Tokyo, Japan

[21] Appl. No.: 823,095

[22] Filed: Jan. 21, 1986

[30] Foreign Application Priority Data

Jan. 22, 1985 [JP] Japan .................. 60-9548

[51] Int. Cl.⁴ .............................................. H04M 1/65
[52] U.S. Cl. ......................................... 379/80; 379/81
[58] Field of Search .................... 360/72.2, 74.4, 65; 379/70, 76, 77, 80; 369/25

[56] References Cited

U.S. PATENT DOCUMENTS

| | | | |
|---|---|---|---|
| 3,787,625 | 1/1974 | Sato ..................................... | 379/80 |
| 4,032,712 | 6/1977 | Catto et al. .......................... | 379/76 |
| 4,219,702 | 8/1980 | Smith, Jr. ............................. | 369/25 |
| 4,422,109 | 12/1983 | Sampei et al. ...................... | 360/65 |
| 4,445,148 | 4/1984 | Bahle ................................... | 379/70 |
| 4,469,919 | 9/1984 | Nakamura et al. ................. | 379/77 |
| 4,553,180 | 11/1985 | Hasegawa ........................... | 360/74.4 |

Primary Examiner—Alan Faber
Assistant Examiner—James E. Tomassini
Attorney, Agent, or Firm—Lowe, Price, LeBlanc, Becker & Shur

[57] ABSTRACT

In an automatic telephone answering and recording device which detects a pause between words during recording the outgoing message tape to identify the end of the outgoing message and switch the incoming message tape T-2 to record an incoming message, if there is a pause that occurs within a couple of seconds from the start of the tape during recording of the outgoing message, the incoming message tape T-2 is not switched on. However, if there is a pause after a couple of seconds from the start, the incoming message tape T-2 is turned on to record an incoming message. This makes it possible for a general user to record the outgoing message through a microphone or from a distant location without concern that any inadvertent hesitation in the outgoing message will turn on the incoming message tape T-2 early.

5 Claims, 3 Drawing Sheets

TELEPHONE ANSWERING DEVICE HAVING OUTGOING MESSAGE PAUSE TIMER FUNCTION

BACKGROUND OF THE INVENTION

The present invention provides a new means for recording the outgoing message of a telephone answering device.

In a conventional telephone answering device, the outgoing message which is recorded by a general user is more personal and more varied than that recorded by professional people. In some models, when there is an inadvertent pause for a couple of seconds within at least a paragraph during the recording of the outgoing message, the pause is interpreted as the end of the outgoing message and the incoming message tape is automatically driven in place of the outgoing message tape. On the other hand, when there is an inadvertent pause upon starting the outgoing message tape because of a hesitation by the user, the incoming message tape T-2 is automatically driven after a pause of a couple of seconds occurs after the start of the outgoing message tape. In this case, a calling party is unable to listen to the outgoing message at all.

SUMMARY OF THE INVENTION

It is an object of the present invention to prevent the incoming message tape T-2 from driving in place of the outgoing message tape if a pause and thereby a blank portion for at least a couple of seconds occur after the start of the outgoing message tape during the recording of the outgoing message.

It is another object of the invention to make it possible to drive the incoming message tape T-2 at the end of the outgoing message even when there is provided unintentionally a pause for more than a couple of seconds between words during the recording of the outgoing message.

It is still another object to drive the incoming message tape T-2 after the outgoing message tape without using the beep tone of the T-1 tape in the conventional telephone answering device when the pause is detected to drive the incoming message tape T-2.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

The arrangement and operation of the preferred embodiments according to the present invention will now be described.

Figure 1:
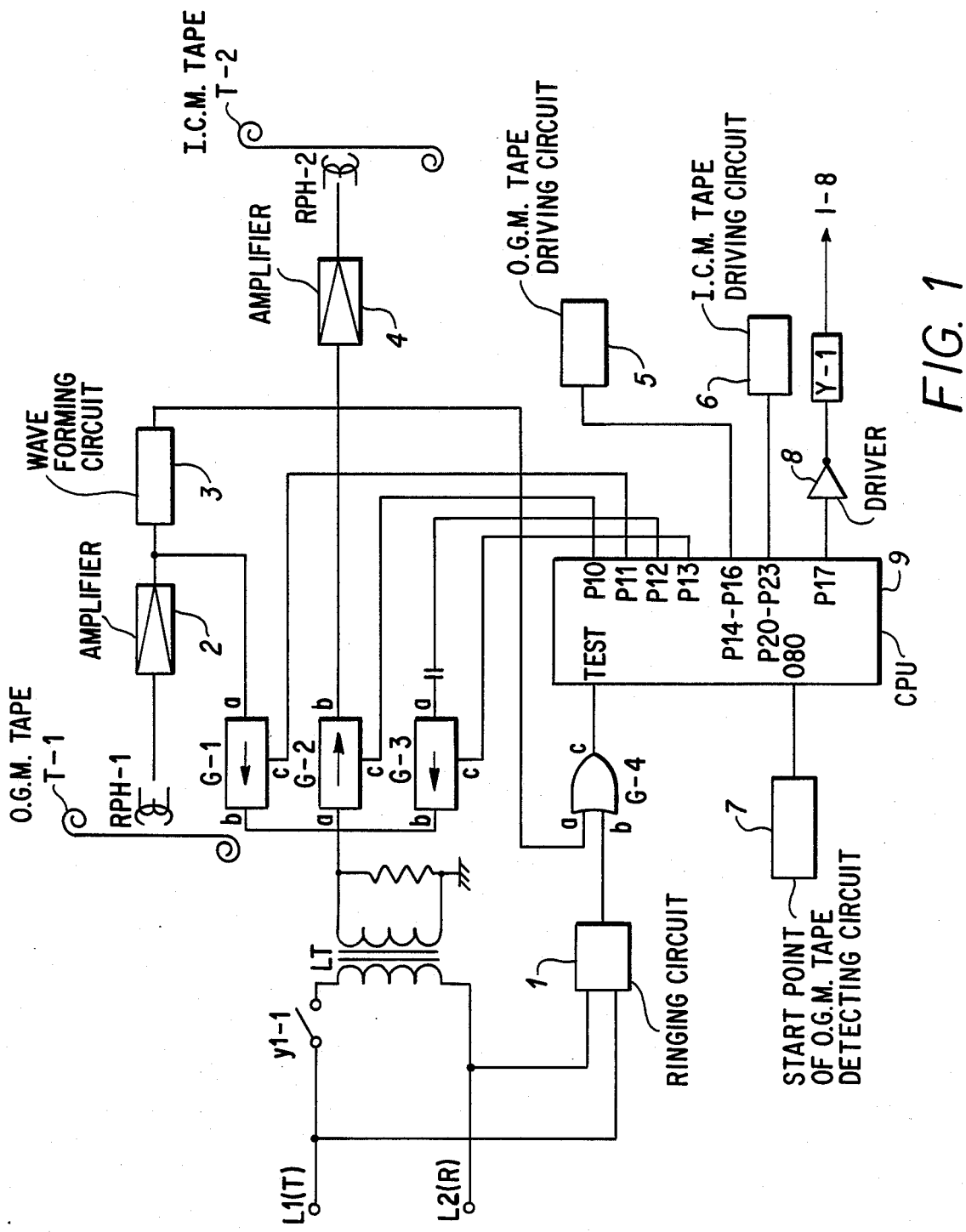
FIG. 1 is a circuit diagram which shows a principle of the embodiments of the present invention.
Figures 2, 3:
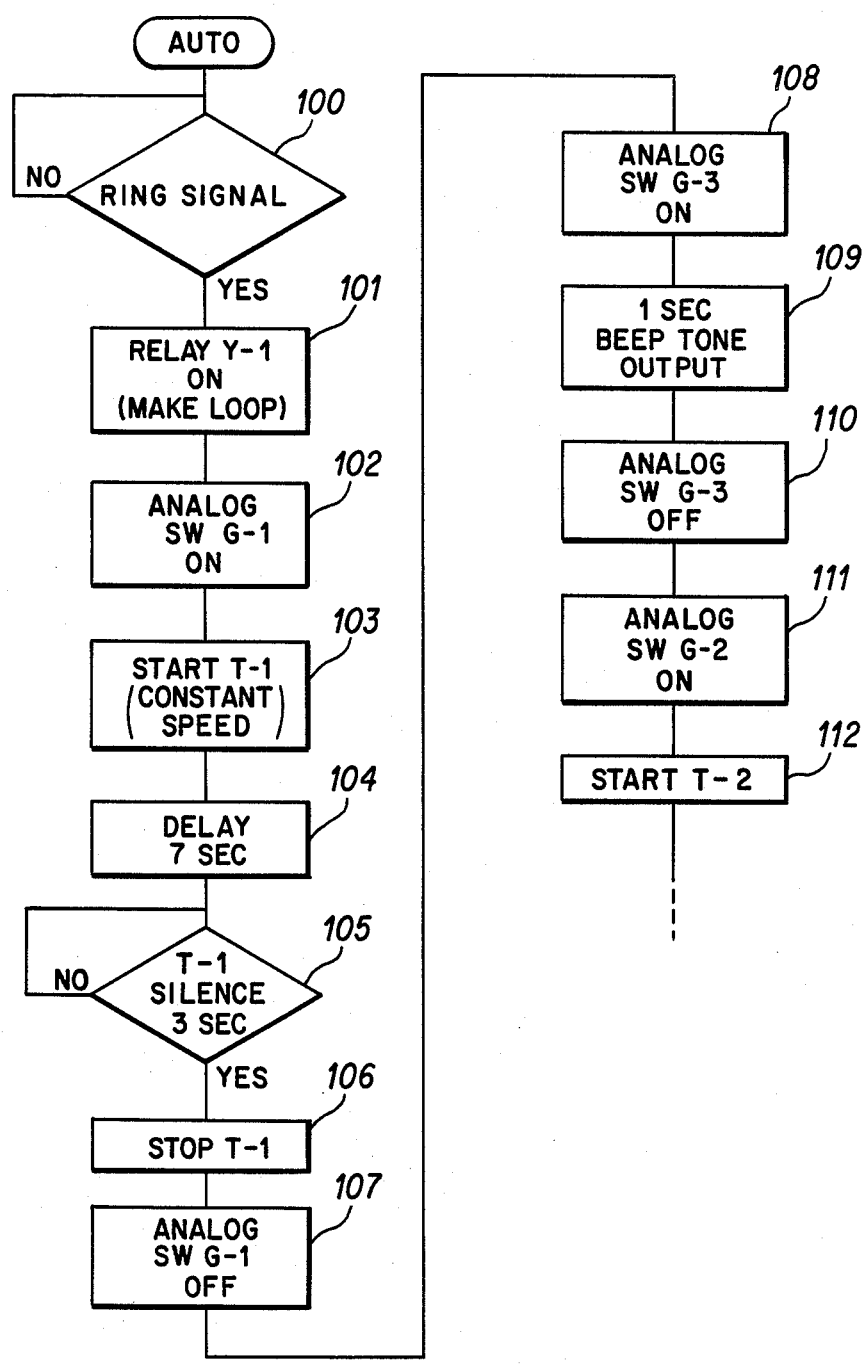
FIG. 2 is a diagram which shows the recording conditions of the signal or the voice on the tape.
FIG. 3 is a flow chart which shows the operation of the system of FIG. 1.

Referring to FIG. 1, reference symbols L 1 and L 2 denote telephone lines. Reference symbol T-1 denotes an outgoing message (hereinafter called as O.G.M.) tape on which the O.G.M. is recorded as shown in FIG. 2; T-2, an incoming message (hereinafter called as I.C.M.) tape for recording the message from the calling party; and LT, a line transformer. Reference numeral 1 denotes a ringing circuit for detecting a calling signal; 2, an amplifier for playing back T-1; 3, a waveforming circuit for generating an output digital level signal to a CPU mentioned later; and 4, an amplifier for recording the above T-2. Reference numeral 9 denotes a microprocessor (CPU), such as an INTEL 8048 which has a 1 kilobyte ROM, as used in the present embodiment, terminals TEST 1, DB 0 are used as input terminals, and P 10 to P 17 and P 20 to P 23 as output terminals. A circuit 5 for driving the O.G.M. tape controls normal forwarding, fast forwarding and rewinding of the O.G.M. tape according to the setting of 3 bits of terminals P 14 to P 16. Reference numeral 6 denotes a circuit for driving the I.C.M. tape; 7, a circuit for detecting the start point of O.G.M. tape; and 8, a driver. Reference symbol Y-1 denotes a relay for loop making. Reference symbols G-1 to G-3 denote analog switches and G-4 denotes an OR gate. Circuits having no direct relation to the present invention are omitted.

Operation will be described in the first embodiment with reference to the flow chart of FIG. 3.

It is assumed that the O.G.M. is recorded on the O.G.M. tape T-1 s shown in FIG. 2 and that the O.G.M. tape is set at the start position of the O.G.M. in the standby mode, as shown in FIG. 1. When a calling signal comes into terminals L 1 and L 2 in FIG. 1, the program in FIG. 3 checks whether it is actually a calling signal that is received through the ringing circuit 1, terminals b, c of the OR gate G-4 and terminal TEST 1 of CPU (step 100). If the input signal is determined to be a calling signal, the program advances from step 100 to step 101 as shown in FIG. 3. In step 101, the output terminal P 17 of CPU is changed from logic "0" to logic "1" and the relay Y-1 is maintained in the operation mode. A loop circuit of the telephone line is formed through its contact yl-1. Thus the calling signal stops ringing and the telephone is engaged.

In step 102, the output terminal P 11 of CPU is set to a logic "1" and the analog switch G-1 is turned on. In step 103, the output terminals P 14, P 15 and P 16 are set to a logic "1", logic "1" and logic "0", respectively.

The circuit 5 for driving the O.G.M. tape is now supplied with current and the O.G.M. tape T-1 is driven at normal speed. Accordingly, the O.G.M. which is recorded as shown in FIG. 2 is played back by the recording and playing back head RPH-1 and amplified by the amplifier 2. The O.G.M. is then applied on the telephone line through analog switch G-1 and the line transformer LT.

When the O.G.M. is recorded, during the portion between a start point t 0 (in case of having a leader tape, the point after a leader tape) and a point t 1, nothing is recorded and the recording of the O.G.M. sometimes starts from the point t 1. In this case, the blank portion between t 0 and t 1 is erroneously determined to be the blank portion after the end point of the O.G.M., t 3. Thus the O.G.M. is not reproduced on the telephone line and the device is switched to the recording mode to record on the I.C.M. tape.

According to the present invention, in order to solve this problem, in step 104, there is a delay time, for example, 7 seconds. Then, as mentioned hereinafter, if the blank portion between t 0 and t 1 occurs within 7 seconds, the device is not operated erroneously.

More particularly, after the above delay time, in the next step 105, it is determined whether or not the blank portion after the end point of the O.G.M. continues for three seconds. The time is set at three seconds because it is possible to record an ordinary O.G.M. without pausing for more than three seconds. Although not shown in FIG. 1, if there is a pause for more than three seconds during the recording of the O.G.M., the alarm sounds as an instruction to record once more.

When the blank portion for three seconds is detected, the program advances to step 106. In step 106, the circuit 5 for driving the O.G.M. tape is de-energized and the running of the O.G.M. tape T-1 is maintained paused. In the next step 107, the analog switch G-1 which was turned on is now turned off. In step 108, the analog switch G-3 is turned on. In step 109, the beep tone which is made by the program is generated for one second from the output terminal P 12 and sent to the calling party through the said analog switch G-3 which is turned on.

After sending the beep tone, the analog switch G-3 is turned off in step 110 and the analog switch G-2 is turned on in step 111. In the next step 112, the circuit 6 for driving the I.C.M. tape is energized, the I.C.M. tape T-2 is driven in the recording mode and the I.C.M. by the calling party is recorded on tape T-2. The subsequent operation of the device is not shown in the Figure, but when this recording operation is finished, the O.G.M. tape T-1 is set at the start position of the O.G.M. and the device returns to the standby mode.

Figure 4:
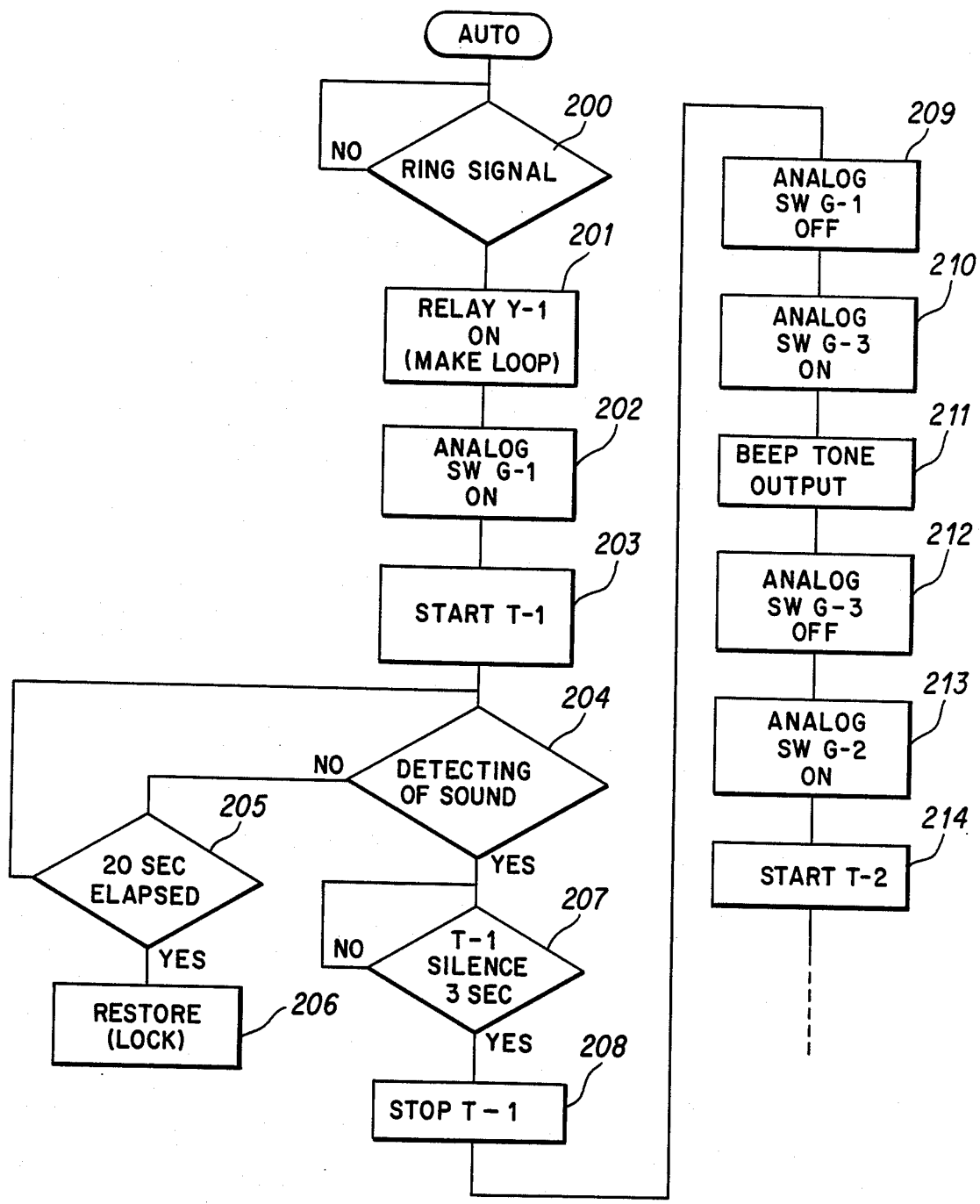
FIG. 4 is a flow chart of another embodiment.

Referring now to the flow chart of FIG. 4, there is shown a second embodiment which is a further improvement on the first embodiment. More particularly, whereas in the first embodiment a delay time, for example, 7 seconds, is provided in step 104 so that it is necessary to record the O.G.M. within 7 seconds from the start point of the O.G.M. (sufficient under normal conditions), while in the second embodiment described hereinafter, whether or not voice is recorded on the tape is determined. The blank portion after the recording of voice is then detected to send out the beep tone and the device is switched to the recording mode of the I.C.M. tape.

The same description as in the flow chart of FIG. 3 will now be simplified. When the calling signal arrives, the relay Y-1 is energized and a loop circuit is formed to drive the O.G.M. tape T-1 in steps 200 to 203. In step 204 whether or not voice is recorded on the O.G.M. tape T-1 is checked. More particularly, the O.G.M. voice which is conditioned by the waveforming circuit 3 is applied to the input terminal TEST 1 of CPU. The CPU in the present embodiment counts the input signal through the above terminal TEST 1. Thereby, the amplitude of the input signal (voice) is counted, for example, every 100 milliseconds and compared with the previous count. Since the count of the voice waveform which is not steady varies among cycles, the waveform is determined to be a voice signal. Alternatively, it is possible to identify a voice by whether or not there is a signal at a given instant, because a continuous control signal is not recorded on the O.G.M. tape of the present device.

Just after the O.G.M. tape T-1 starts and until the O.G.M. is played back, the program advances from step 204 to step 205. If 20 seconds do not elapse, the program returns back to step 204. This action of the program is repeated.

The time of 20 seconds is provided in step 205 because it is not natural that no sound occurs continuously for within 20 seconds from the start point during the recording of the normal O.G.M. In this case it is regarded as an accident, for example, the insertion of a tape in which the O.G.M. is not recorded or entanglement of the tape, and the program advances to step 206.

The device is locked and kept from operating in response to any subsequent call. When voice is detected, the program advances from step 204 to step 207. Now the blank portion after the end of O.G.M. is checked.

The remaining steps are the same as in the flow chart of FIG. 3. When the blank portion is detected, the beep tone is sent out and the I.C.M. tape T-2 is switched to the recording mode. After recording, the O.G.M. tape is set at the start position of the O.G.M. and the device returns to the standby mode.

Furthermore, in order to implement the second embodiment by logic circuitry using ICs (Integrated Circuits), the operation is as follows: a flip-flop circuit is operated in response to the O.G.M. voice which is played back. Both the output from the flip-flop circuit and the output which is generated upon detecting the silence thereafter are applied to an AND circuit. The beep tone generating circuit is operated by the output from the AND circuit and the I.C.M. tape can be switched to the recording mode.

In a telephone answering device, there is a device which operates exclusively as an answer only device in response to a call after the I.C.M. tape is finished. More particularly, the O.G.M. for the answer-only device is prerecorded on the second track of the O.G.M. tape or the latter half of the O.G.M. tape and the O.G.M. for the answer-only device is sent out in response to the call when the I.C.M. tape is finished. It is thus possible to carry out this invention when the user wants to record the special O.G.M. on a tape from a remote location through the telephone line.

Although certain preferred embodiments have been shown and described, it should be understood that many changes and modifications may be made therein without departing from the scope of the invention.

What is claimed is:

1. A telephone answering device comprising:
   (a) a drive mechanism for driving alternatively an incoming message storage medium and an outgoing message storage medium and means responsive to an incoming call on a telephone line for playback onto the telephone line of an outgoing message recorded on the outgoing message storage medium and thereafter recording an incoming message on the incoming message storage medium;
   (b) means for recording an outgoing message on the outgoing message medium;
   (c) means for detecting the start of said outgoing message storage medium and in response generating an output;
   (d) means for energizing a timer having an elapsed time, e.g., seven seconds, from the start of the outgoing message in response to said output;
   (e) means for detecting a pause in the outgoing message after said elapsed time during playback of the outgoing message;
   (f) means responsive to said pause for generating an audible signal;
   (g) means for shifting said driving mechanism from outgoing message medium to incoming message medium in response to said audible signal; and (h) means responsive to said timer for inhibiting said audible signal during said elapsed time so that the driving mechanism is not shifted if the pause has occurred within said elapsed time from the startup of the outgoing message medium.

2. A telephone answering device, comprising:

means for driving alternatively an incoming message recording medium and an outgoing message reproducing medium and means responsive to an incoming call on a telephone line for reproducing onto the telephone line an outgoing message recorded on the outgoing message storage medium and thereafter recording an incoming message on the incoming message storage medium;

means for establishing first and second predetermined time intervals, e.g., several seconds and twenty seconds, respectively;

means for detecting the start of said outgoing message reproducing medium;

means for detecting a pause in said outgoing message;

means for measuring the duration of said pause and for generating a first control signal in response to said pause having a duration greater than said first predetermined time interval;

means for measuring an elapsed time from the start of said outgoing message reproducing medium to the start of said outgoing message and for generating a second control signal in response to said elapsed time greater than said second predetermined time interval;

means for switching said driving means from said outgoing message reproducing medium to said incoming message recording medium in response to said first control signal; and means responsive to said second control signal for controlling said switching means so that said driving means is not switched in response to said first control signal.

3. A telephone answering device, comprising:

means for driving alternatively an incoming message recording medium and an outgoing message reproducing medium and means responsive to an incoming call on a telephone line for reproducing onto the telephone line an outgoing message recorded on the outgoing message storage medium and thereafter recording an incoming message on the incoming message storage medium;

means for detecting an audible sound reproduced by said outgoing message reproducing medium and, in response, generating a first control signal;

means for detecting a pause in said outgoing message;

means for establishing a first predetermined time duration, e.g. several seconds;

means enabled by said first signal for measuring the time duration of said pause and for generating a second control signal in response to said time duration of said pause greater than said first predetermined time duration;

means responsive to said second control signal for switching said driving means from said outgoing message reproducing medium to said incoming message recording medium;

means for detecting a start of said outgoing message reproducing medium;

means for establishing a second predetermined time duration, e.g. twenty seconds;

means for measuring a time elapsed from the start of said outgoing message to generation of said audible sound; and means responsive to said elapsed time greater ;than said second predetermined time duration for indicating a fault.

4. A method of operating a telephone answering device having a drive means for driving alternatively an incoming message recording medium and an outgoing message reproducing medium and means responsive to an incoming call on a telephone line for reproducing onto the telephone line an outgoing message recorded on the outgoing message storage medium and thereafter recording an incoming message on the incoming message storage medium, comprising the steps of detecting a startup of said outgoing message reproducing medium, measuring a time elapsed from said startup, to the beginning of said outgoing message detecting pause in an outgoing message reproduced by said outgoing message reproducing medium, measuring the duration of said pause and switching said drive from said outgoing message reproducing medium to said incoming message recording medium only if the time duration, e.g., several seconds, of said pause is greater than a predetermined time duration and said time elapsed from the startup of said outgoing message reproducing medium is less than a predetermined elapsed time, e.g., twenty seconds.

5. A method of operating a telephone answering device having a drive means for driving alternatively an incoming message recording medium and an outgoing message reproducing medium and means responsive to an incoming call on a telephone line for reproducing onto the telephone line an outgoing message recorded on the outgoing message storage medium and thereafter recording an incoming message on the incoming message storage medium, comprising the steps of detecting an audible sound reproduced by said outgoing message reproducing medium, thereafter detecting the duration of any pause in an outgoing message reproduced by said outgoing message reproducing medium and, if the pause has a duration greater than a predetermined duration, e.g., several seconds, switching the drive means from said outgoing message reproducing medium to said incoming message recording medium; and measuring a time elapsed from a startup of said outgoing message reproducing medium to a detection of audible sound reproduced by said outgoing message reproducing medium and indicating a fault if the time elapsed is greater than a predetermined elapsed time, e.g., twenty seconds.

* * * * *